(12) United States Patent
Tateno et al.

(10) Patent No.: US 10,071,460 B2
(45) Date of Patent: Sep. 11, 2018

(54) POLISHING PAD AND METHOD FOR PRODUCING POLISHING PAD

(71) Applicant: FUJIBO HOLDINGS, INC., Chuo-ku (JP)

(72) Inventors: Teppei Tateno, Saijo (JP); Hirohito Miyasaka, Saijo (JP); Ryuma Matsuoka, Saijo (JP); Yoshie Kanazawa, Saijo (JP); Fumio Miyazawa, Gotemba (JP)

(73) Assignee: FUJIBO HOLDINGS, INC., Chuo-ku, Tokyo (JP)

( * ) Notice: Subject to any disclaimer, the term of this patent is extended or adjusted under 35 U.S.C. 154(b) by 615 days.

(21) Appl. No.: 14/385,894

(22) PCT Filed: Mar. 26, 2013

(86) PCT No.: PCT/JP2013/058690
§ 371 (c)(1),
(2) Date: Sep. 17, 2014

(87) PCT Pub. No.: WO2013/146733
PCT Pub. Date: Oct. 3, 2013

(65) Prior Publication Data
US 2015/0068129 A1 Mar. 12, 2015

(30) Foreign Application Priority Data
Mar. 26, 2012 (JP) ................. 2012-070037

(51) Int. Cl.
*B24B 1/00* (2006.01)
*B24D 3/00* (2006.01)
(Continued)

(52) U.S. Cl.
CPC .......... *B24B 37/24* (2013.01); *C08G 18/4238* (2013.01); *C08G 18/44* (2013.01);
(Continued)

(58) Field of Classification Search
None
See application file for complete search history.

(56) References Cited

U.S. PATENT DOCUMENTS 3,100,721 A * 8/1963 Holden .................. B29C 44/28
264/DIG. 13
3,284,274 A * 11/1966 Hulslander ........... B29C 67/202
156/153
(Continued)

FOREIGN PATENT DOCUMENTS

JP 2-220838 A 9/1990
JP 8-187655 A 7/1996
(Continued)

OTHER PUBLICATIONS http://www.cati.com/blog/2011/07/convert-durometer-to-youngs-modulus/ (Dec. 19, 2017).*
(Continued)

*Primary Examiner* — Colleen P Dunn
*Assistant Examiner* — Ross J Christie
(74) *Attorney, Agent, or Firm* — Buchanan, Ingersoll & Rooney PC

(57) ABSTRACT

Provided are a method for producing a finish polishing pad and the polishing pad which allow formation of a stable film and enables polishing with fewer polishing scratches. The method includes the steps of: dissolving a composition for forming polyurethane resin film containing a polyurethane resin and an additive(s) in a solvent capable of dissolving the resin; removing an insoluble component(s) to make the content of the insoluble component(s) in the solution less than 1% by mass relative to the total mass of the composition; adding a poor solvent to the solution from which the insoluble component(s) has(have) been removed, followed by mixing, the amount of the poor solvent added being calculated according to a defined Formula 1; and forming a
(Continued)

(a) 35×

(b) 50× film from the mixture solution on the film formation substrate by a wet coagulation method, to thereby form the polyurethane resin film.

18 Claims, 1 Drawing Sheet

(51) Int. Cl.
    *B24B 37/24*     (2012.01)
    *C08G 18/48*     (2006.01)
    *C08G 18/76*     (2006.01)
    *C08G 18/42*     (2006.01)
    *C08G 18/44*     (2006.01)
    *C08L 75/04*     (2006.01)
    *C08L 75/06*     (2006.01)

(52) U.S. Cl.
    CPC ..... *C08G 18/4825* (2013.01); *C08G 18/4854* (2013.01); *C08G 18/7671* (2013.01); *C08L 75/04* (2013.01); *C08L 75/06* (2013.01)

(56) References Cited

U.S. PATENT DOCUMENTS

| | | | | |
|---|---|---|---|---|
| 4,028,451 | A | * | 6/1977 | Warwicker .............. B29C 44/20 264/216 |
| 4,135,011 | A | * | 1/1979 | Mimura ................. C08G 18/12 427/246 |
| 4,753,838 | A | | 6/1988 | Kimura et al. |
| 4,841,680 | A | | 6/1989 | Hoffstein et al. |
| 4,927,432 | A | | 5/1990 | Budinger et al. |
| 6,715,318 | B2 | * | 4/2004 | Mitani ..................... B32B 3/02 451/41 |
| 2002/0081946 | A1 | * | 6/2002 | Scott ....................... B24B 37/22 451/36 |
| 2003/0150169 | A1 | * | 8/2003 | Annen ................. B24D 11/008 51/300 |
| 2006/0202384 | A1 | | 9/2006 | Duong et al. |
| 2009/0008142 | A1 | * | 1/2009 | Shimizu .................... B32B 5/18 174/261 |
| 2009/0110900 | A1 | * | 4/2009 | Yokota ................... B01D 69/02 428/221 |
| 2010/0009611 | A1 | | 1/2010 | Fukuda et al. |
| 2010/0136372 | A1 | * | 6/2010 | Ishida ..................... B24B 37/24 451/41 |
| 2010/0210197 | A1 | * | 8/2010 | Matsumura ............. B24B 37/22 451/526 |
| 2011/0171890 | A1 | * | 7/2011 | Nakayama .............. B24B 37/24 51/298 |

FOREIGN PATENT DOCUMENTS

| | | | |
|---|---|---|---|
| JP | 11-99480 | A | 4/1999 |
| JP | 2006-253691 | A | 9/2006 |
| JP | 2008307683 | A | 12/2008 |
| JP | 4373152 | B2 | 11/2009 |
| JP | 2010-179431 | A | 8/2010 |
| JP | 2010228075 | A | 10/2010 |
| JP | 2011-067923 | A | 4/2011 |
| JP | 2011200988 | A * | 10/2011 |
| JP | 2011200988 | A | 10/2011 |

OTHER PUBLICATIONS

International Search Report (PCT/ISA/210) dated May 14, 2013, by the Japanese Patent Office as the International Searching Authority for International Application No. PCT/JP2013/058690.
Written Opinion (PCT/ISA/237) dated May 14, 2013, by the Japanese Patent Office as the International Searching Authority for International Application No. PCT/JP2013/058690.
Extended Search Report issued by the European Patent Office in corresponding European Patent Application No. 13769546.6 dated Sep. 10, 2015 (5 pages).
Office Action dated Sep. 8, 2016, by the Taiwanese Patent Office in corresponding Taiwanese Patent Application No. 102110518 (3 pages).

* cited by examiner (a) 35×

(b) 50×

(a) 35×

(b) 50×

(a) 50×

(b) 100×

POLISHING PAD AND METHOD FOR PRODUCING POLISHING PAD

TECHNICAL FIELD

The present invention relates to a polishing pad and a method for producing the same. More particularly, the present invention relates to a finish polishing pad capable of achieving reduced formation of defects in bare silicon, semiconductor devices, and magnetic disk, and a method for producing the same.

BACKGROUND ART

Polishing pads used for polishing semiconductor devices and the like are generally classified into hard ones and soft ones. Hard polishing pads are prepared mainly based on the dry method in which a urethane prepolymer is formed by chain-extension. Soft polishing pads are prepared mainly based on the wet method in which a urethane resin solution is coagulated in a coagulation bath and dried. Recently, polished workpieces have been required to have high flatness and uniformity, and soft polishing pads have increasingly been used in a finish polishing step and the like.

Especially, it is particularly desirable that a finish polishing step of bare silicon, semiconductor devices, and magnetic disks be excellent in polishing amount and polishing flatness, and be reduced in formation of polishing scratches (also referred to as defects). In a conventional finish polishing step, a polishing pad having a wet urethane resin film as a polishing layer has been used (see, for example, Patent Documents 1 and 2).

However, conventional wet polishing pads still have a problem of a high tendency to cause polishing scratches.

CITATION LIST

Patent Literatures

Patent Literature 1: Japanese Patent Application Publication No. Hei 2-220838
Patent Literature 2: Japanese Patent Application Publication No. 2011-067923

SUMMARY OF INVENTION

Technical Problems

As described above, the use of a conventional polishing pad having a wet urethane resin film as the polishing layer still has the problem of a tendency to cause polishing scratches. The present inventors have found that a cause of making the polishing scratches worse is that components, such as a film-forming auxiliary agent and a foam-controlling auxiliary agent, added to the resin matrix constituting the polishing layer are partially insoluble in the solvent used for the formation of the resin film, and these components remain as undissolved contents. A filler, such as carbon black, is added to a wet resin film for the purposes of modifying elastic characteristics and increasing polishing stability. The present inventors have found that, in particular, this insoluble component is a main cause of the polishing scratches.

Meanwhile, the film-forming auxiliary agent and the foam-controlling auxiliary agent function as stabilizers in the film formation. Hence, the removal or decrease in amount of these agents causes a problem of film formability.

Accordingly, an object of the present invention is to provide a method for producing a finish polishing pad and the polishing pad which overcome these problems, enable polishing with less polishing scratches, and allow formation of a stable film.

Solution to Problems

The present invention solves the above-described problems by the following polishing pad and method for producing the same.

(1) A method for producing a polishing pad comprising a film formation substrate, and a polyurethane resin film as a polishing layer on the film formation substrate, the method comprising the steps of:

dissolving a composition for forming a polyurethane resin film containing a polyurethane resin and an additive(s) in a solvent capable of dissolving the resin;

removing an insoluble component(s) to make the content of the insoluble component(s) in the solution less than 1% by mass relative to the total mass (solid content mass) of the composition for forming polyurethane resin film;

adding a poor solvent to the solution from which the insoluble component(s) has(have) been removed, followed by mixing, the amount (ml) of the poor solvent to be added per gram of the solid content mass of the resin being calculated according to Formula 1: the amount (ml)=a coagulation value (ml) of the polyurethane resin determined by using the poor solvent×A (A=0.007 to 0.027); and forming a film from the mixture solution on the film formation substrate by a wet coagulation method, to thereby form the polyurethane resin film.

(2) The production method according to (1), wherein the solvent capable of dissolving the polyurethane resin is a water-miscible organic solvent.

(3) A polishing pad comprising:
a film formation substrate; and
a polyurethane resin film formed on the film formation substrate by a wet coagulation method as a polishing layer, wherein the content of a component(s) which is(are) insoluble when the polyurethane resin film is dissolved in a solvent capable of dissolving a polyurethane resin forming the film is less than 1% by mass relative to a dry mass of the polyurethane resin film, the polyurethane resin has a coagulation value (determined by using water as a poor solvent) in a range from 8 to 20 (ml), and the number of foamed cells on a top surface of the polishing layer made of the polyurethane resin film is 100 cells/mm$^2$ to 270 cells/mm$^2$.

(4) A polishing pad produced by the production method according to (1) or (2), wherein the polyurethane resin has a coagulation value (determined by using water as a poor solvent) in a range from 8 to 20 (ml).

(5) The polishing pad according to (3) or (4), wherein an average pore diameter on a top surface of the polishing layer made of the polyurethane resin film is 30 µm or more.

Advantageous Effects of Invention

The polishing pad and the method for producing the same of the present invention makes it possible to provide a polishing pad which achieves reduced formation of defects and which has stable film formability.

The method for producing a polishing pad of the present invention reduces the localization, aggregation, and the like of the insoluble content (insoluble component), so that the obtained polishing pad achieves reduced formation of defects during polishing. In addition, since the poor solvent is added in an amount satisfying Formula 1, a polishing layer comprising a polyurethane resin film can be obtained with stable film formability, even with a formulation not containing an additive such as carbon black. Moreover, owing to the appropriate coagulation value of the polishing layer of the polishing pad of the present invention, partial wear due to uneven slurry circulation is less likely to occur during polishing. Hence, formation of defects due to sludge accumulation can be suppressed. When the hardness, the number of foamed cells, the current value (=friction resistance), or the like is within the preferred range, the polishing efficiencies (the rate and the uniformity) are excellent.

DESCRIPTION OF EMBODIMENTS

Figure 1:
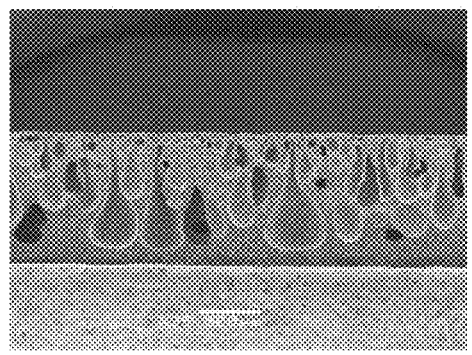
FIG. 1 shows cross-sectional views (SEM with 35 times and 50 times magnification) of a polyurethane resin film of Example 1.
Figure 1:
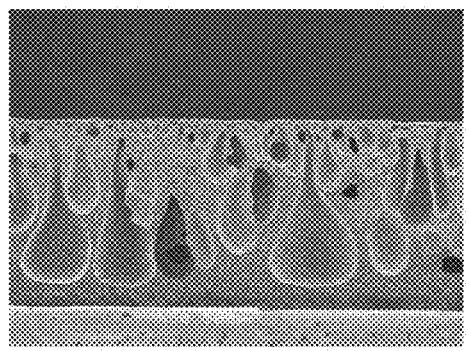
Figure 2:
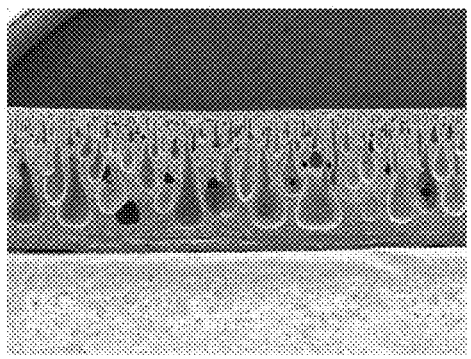
FIG. 2 shows cross-sectional views (SEM with 35 times and 50 times magnification) of a polyurethane resin film of Example 2.
Figure 2:
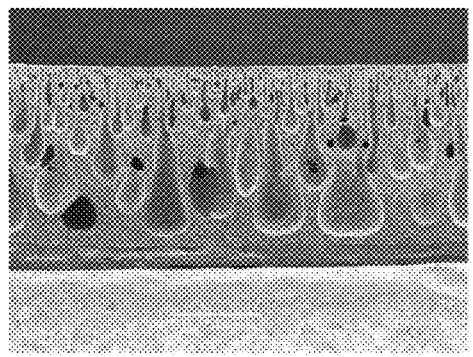
Figure 3:
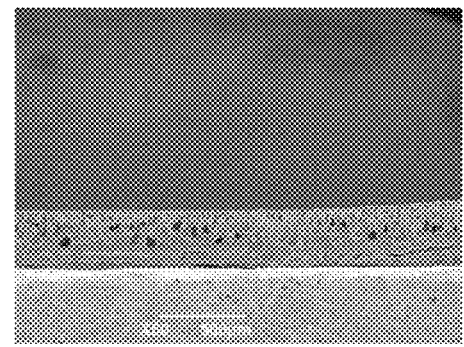
FIG. 3 shows cross-sectional views (SEM with 50 times and 100 times magnification) of a polyurethane resin film of Comparative Example 2.
Figure 3:
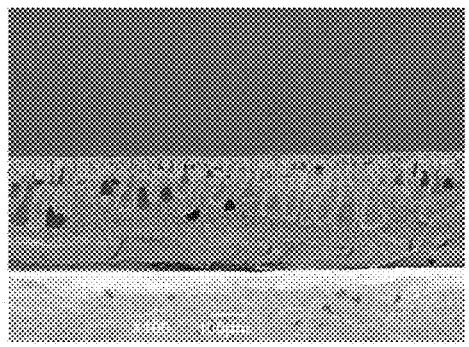

Hereinafter, embodiments for carrying out the present invention are described.

1. Method for Producing Polishing Pad

A method for producing a polishing pad of the present invention is a method for producing a polishing pad comprising a film formation substrate, and a polyurethane resin film as a polishing layer on the film formation substrate, the method comprising the following steps of:

dissolving a composition for forming a polyurethane resin film containing a polyurethane resin and an additive(s) in a solvent capable of dissolving the resin;

removing an insoluble component(s) to make the content of the insoluble component(s) in the solution less than 1% by mass relative to the total mass of the composition for forming polyurethane resin film;

adding a poor solvent to the solution from which the insoluble component(s) is(are) removed, followed by mixing, the amount (ml) of the poor solvent added per gram of the solid content of the polyurethane resin being calculated according to Formula 1: the amount (ml)=a coagulation value (ml) of the polyurethane resin determined by using the poor solvent×A (A=0.007 to 0.027); and forming a film from the mixture solution on the film formation substrate by a wet coagulation method, to thereby form the polyurethane resin film.

Each of the steps is described.

1.1. Step of Dissolving Composition for Forming Polyurethane Resin Film Containing Polyurethane Resin and Additive(s) in Solvent Capable of Dissolving Polyurethane Resin The polyurethane resin film which is the polishing layer of the polishing pad of the present invention contains a polyurethane resin as a main component. The term "containing as a main component" means that the component is contained in an amount of 50% by mass or more, more preferably 80% by mass or more, and further preferably 90% by mass or more relative to the dry mass of the film. The type of the polyurethane resin is not particularly limited, and may be selected from various polyurethane resins according to the purpose of use. For example, polyester-based, polyether-based, or polycarbonate-based resins can be used.

The polyester-based resins include polymerization products of a diisocyanate such as diphenylmethane-4,4'-diisocyanate with a polyester polyol of ethylene glycol, butylene glycol, or the like and adipic acid or the like. The polyether-based resins include condensation products of an isocyanate such as diphenylmethane-4,4'-diisocyanate with a polyether polyol such as poly(tetramethylene ether) glycol or polypropylene glycol. The polycarbonate-based resins include polymerization products of an isocyanate such as diphenylmethane-4,4'-diisocyanate with a polycarbonate polyol. As these resins, commercially available resins such as ones manufactured by DIC Corporation under the trade name of "CRISVON," manufactured by Sanyo Chemical Industries, Ltd. under the trade name of "SANPRENE", and manufactured by Dainichiseika Color & Chemicals Mfg. Co., Ltd. under the trade name of "RESAMINE" may be used. A resin having desired characteristics may be produced by yourself.

In addition to the polyurethane resin, the polishing layer of the present invention contains an additive(s) such as a film-forming auxiliary agent and a foam-controlling auxiliary agent, as needed. The additives are preferably selected from the group consisting of film-forming auxiliary agents and foam-controlling auxiliary agents.

The film-forming auxiliary agents include hydrophobic active agents and the like. Examples of the hydrophobic active agents include nonionic surfactants such as polyoxyethylene alkyl ethers, polyoxypropylene alkyl ethers, polyoxyethylene polyoxypropylene alkyl ethers, perfluoroalkyl ethylene oxide adducts, glycerin fatty acid esters, and propylene glycol fatty acid esters, and anionic surfactants such as alkylcarboxylic acids.

The foam-controlling auxiliary agents include hydrophilic active agents and the like. Examples of the hydrophilic active agents include anionic surfactants such as carboxylic acid salts, sulfonic acid salts, sulfuric acid ester salts, and phosphoric acid ester salts.

When a film-forming auxiliary agent is added as the additive, the film-forming auxiliary agent is preferably added in an amount of 0.2 to 10% by mass relative to the solid content mass of the composition for forming polyurethane resin film. When a foam-suppressing auxiliary agent is added as an additive, the foam-suppressing auxiliary agent is preferably added in an amount of 0.2 to 10% by mass relative to the solid content mass of the composition for forming polyurethane resin film.

The solvent capable of dissolving the polyurethane resin include water-miscible organic solvents. Any organic solvent can be used without any particular limitation, as long as the organic solvent can dissolve the polyurethane resin and is water-miscible. Examples of the organic solvents include N,N-dimethylformamide (DMF), N,N-dimethylacetamide (DMAc), tetrahydrofuran (THF), dimethyl sulfoxide (DMSO), N-methylpyrrolidone (NMP), acetone, and the like. Of these organic solvents, DMF or DMAc is preferably used.

The concentration of the polyurethane resin in the solvent capable of dissolving the polyurethane resin is preferably 15 to 50% by mass, and more preferably 20 to 40% by mass. At a concentration within the above-described range, the polyurethane-containing solution has a moderate flowability, so that the polyurethane-containing solution can be uniformly applied onto the film formation substrate in a subsequent application step.

1.2. Step of Removing Insoluble Component(s) to Make Content of Insoluble Component(s) in Solution Less than 1% by Mass Relative to Total Mass (Solid Content Mass) of Composition for Forming Polyurethane Resin Film After the above-described composition for forming polyurethane resin film containing the polyurethane resin and the additive(s) is dissolved in the solvent capable of dissolving the polyurethane resin, an insoluble component(s) is(are) removed to make the content of the insoluble component(s) in the solution less than 1% by mass, more preferably less than 0.5% by mass, and further preferably 0% by mass, relative to the total mass (solid content mass) of the composition for forming polyurethane resin film.

A method for removing the insoluble component(s) in the solution may be a method based on centrifugation, filtration, grinding, or the like, and a method based on filtration is preferable, because it is simple. In the filtration, it is preferable to use a nonwoven fabric filter having a filter pore diameter of 5 to 30 μm. A material of the filter may be nylon, polyester, polypropylene, glass fiber, fluorine-based material (PTFE/PFA), or stainless steel. A filter made of any of these materials may be used. From the viewpoints of chemical resistance and contamination (inclusion of contaminant) prevention, it is preferable to use a filter made of a fluorine-based material, polyester, or polypropylene.

1.3. Step of Adding Poor Solvent to Solution from which Insoluble Component(s) is(are) Removed, Followed by Mixing, Amount (ml) of Poor Solvent Added Per Gram of Solid Content of Polyurethane Resin being Calculated According to Formula 1: Amount (ml)=Coagulation Value (ml) of Polyurethane Resin Determined by Using Poor Solvent×A(A=0.007 to 0.027)

In the present invention, a poor solvent can be defined as a solvent which lowers the solubility. Examples of poor solvents of the polyurethane resin include water, lower alcohols, ketones having a small number of carbon atoms, and the poor solvent is preferably water.

The poor solvent of the polyurethane resin is added in an amount (ml/g of mass of polyurethane resin)) calculated according to Formula 1: the amount=coagulation value (ml) of polyurethane resin×A (A=0.007 to 0.027). The addition of the poor solvent enables stable film formation without any foam-controlling auxiliary agent or any film formation-stabilizing auxiliary agent. If the amount of the poor solvent added is below the range of the value calculated according to Formula 1, a foam structure is insufficient, and the film formation is unstable. On the other hand, if the amount is above the range, aggregation occurs excessively, so that the uniformity of the resin film is impaired.

A in Formula 1 is a value determined from amounts of water added and coagulation values in a preferred range, which are obtained by actually forming polishing pads using polyurethane resin films, and then evaluating the polishing rate, the uniformity, and the defects.

In this DESCRIPTION, the "coagulation value" is represented by an amount (ml) of water determined as follows. Specifically, a diluted polyurethane resin-containing solution is prepared by diluting the polyurethane resin formation composition with the solvent capable of dissolving the polyurethane resin to be accentually used, so that the polyurethane resin can be 1% by mass in the polyurethane resin-containing solution. While 100 g of this solution is being stirred with a stirrer with the temperature thereof adjusted to 25° C., the poor solvent at 25° C. is added dropwise. The amount (ml) of water added dropwise required to reach a point where the polyurethane resin forms a gel and the white turbid does not disappear anymore is used to represent the "coagulation value."

When the poor solvent is water, the polyurethane resin preferably has a coagulation value of 8 to 20 (ml), and more preferably 8 to 15 (ml). When the coagulation value is within the above-described range, favorable cell forms tend to be obtained.

1.4. Step of Forming Film from Mixture Solution on Film Formation Substrate by Wet Coagulation Method, to Thereby Form Polyurethane Resin Film A film is formed from the mixture solution obtained by mixing the poor solvent with the solution from which the insoluble component(s) is(are) removed on a film formation substrate by a wet coagulation method.

In the present invention, the film formation substrate is a material serving as a base of the polishing pad, and any substrate ordinarily used in this technical field can be used without any particular limitation. Examples of the film formation substrate include flexible polymer films such as polyester film and polyolefin film; nonwoven fabrics to which an elastic resin is fixed by impregnation; and the like. Of these film formation substrates, polyester films are preferably used.

The wet coagulation method is a method for forming a film from the solution containing the composition for forming polyurethane resin film on the film formation substrate, and is a film formation method comprising a coating step, a coagulation step, and a washing and drying step.

The coating step is a step of substantially uniformly and continuously applying the solution containing the composition for forming polyurethane resin film onto the film formation substrate with a knife coater, a reverse coater, or the like.

The coagulation step is a step of immersing the substrate on which the solution containing the composition for forming polyurethane resin film is applied in a coagulation liquid containing water, which is a poor solvent of the polyurethane resin, as a main component.

As the coagulation liquid, water, a mixture solution of water with a polar solvent such as DMF, or the like is used. In particular, water or a mixture solution of water with a polar solvent such as DMF is preferable. The polar solvent includes water-miscible organic solvents used for dissolving the polyurethane resin such as, for example, DMF, DMAc, THF, DMSO, NMP, and acetone. In addition, the concentration of the polar solvent in the mixture solvent of water with the polar solvent is preferably 0.5 to 30% by mass.

Neither the temperature of the coagulation liquid nor the immersion time is particularly limited, and, for example, the immersion may be conducted at 5 to 80° C. for 5 to 60 minutes.

The washing and drying step is a step of performing washing and drying treatments on the film-shaped polyurethane resin obtained by the coagulation in a coagulation bath after peeling from the film formation substrate or without the peeling.

By the washing treatment, the organic solvent remaining in the polyurethane resin is removed. A washing liquid used for the washing may be water.

After the washing, the drying treatment is conducted on the polyurethane resin. The drying treatment may be conducted by employing a conventionally employed method, and, for example, the polyurethane resin may be dried in a dryer at 80 to 150° C. for about 5 to 60 minutes. Through the above-described steps, the polyurethane resin film can be obtained.

Further, in the present invention, a grinding treatment may be conducted on a top surface and/or a bottom surface of the polyurethane resin film, a grooving treatment or an embossing treatment may be conducted on the top surface, a substrate and/or a pressure-sensitive adhesive layer may be laminated on the polishing layer, or a light transmission portion may be provided, if necessary.

It is particularly preferable to conduct a grinding treatment on the top surface. A method for the grinding treatment is not particularly limited, and the grinding may be conducted by a known method. Specifically, the grinding may be that using a sandpaper. The amount of the grinding can be set, as appropriate, according to the target film thickness, pore diameter, and pore ratio, and is about 50 to 500 μm, for example.

The shape of the grooving treatment or the embossing treatment is not particularly limited, and is, for example, a lattice shape, a concentric-ring shape, a radial shape, or the like.

Regarding the polishing pad of the present invention obtained by the above-described production method, since the amount of the component(s) in the film formation composition insoluble in the solvent is small during the film formation, non-uniformity is less likely to be caused during the film formation, so that a uniform resin film can be formed.

In addition, in the production method of the present invention, the production is conducted by using the resin having a coagulation value (determined by using water as the poor solvent) within the specific range, and adding the predetermined amount of the poor solvent. As a result, such an unexpected effect can be achieved that the affinity for a polishing slurry increases, so that the slurry circulation is smoothed during polishing. Since water, which is a poor solvent, is mixed with the resin solution, the polyurethane resin partially aggregates in the resin solution before the coagulation of the resin solution. This aggregation makes a dense skin layer less likely to be formed in the coagulation liquid, so that the entering of the coagulation liquid into the resin solution and extraction of the solvent by the coagulation liquid proceeds without delay, and substitution occurs stably.

For example, when DMF is used as a solvent for dissolving the composition for forming polyurethane resin film, a sheet-shaped polyurethane resin having a continuous foam structure is formed, as the substitution between DMF and coagulation liquid proceeds. The solvent DMF is removed from the resin solution, and the DMF is substituted with the coagulation liquid. Thus, cells are formed inside the skin layer in the polyurethane resin, and connection holes are formed which make the cells continuous to each other like a network. Here, since the PET film, which is the film formation substrate, is water impermeable, the solvent removal occurs on the top surface side (skin layer side) of the resin solution, so that larger cells are formed on the film formation substrate side than the top surface side.

2. Polishing Pad

An embodiment of the polishing pad of the present invention is a polishing pad comprising a film formation substrate and a polyurethane resin film formed on the film formation substrate by a wet coagulation method as a polishing layer, wherein the content of a component(s) which is(are) insoluble when the polyurethane resin film is dissolved in a solvent capable of dissolving the polyurethane resin of the film is less than 1% by mass relative to the total mass (solid content mass) of the composition for forming polyurethane resin film, and a coagulation value (determined by using water as a poor solvent) is in a range from 8 to 20 (ml).

Meanwhile, another embodiment of the polishing pad of the present invention is a polishing pad comprising a film formation substrate and a polyurethane resin film formed on the film formation substrate by a wet coagulation method, wherein the polyurethane resin has a coagulation value (determined by using water as a poor solvent) in a range from 8 to 20 (ml), and the polishing pad is produced by the above-described production method.

The film formation substrate, the polyurethane resin, the additives, the solvent capable of dissolving the polyurethane resin, the coagulation value, and the poor solvent are the same as those described for the production method.

The coagulation value (determined by using water as a poor solvent) of the polyurethane resin used for the polishing pad of the present invention is in a range from 8 to 20 (ml), and preferably 8 to 15 (ml). This is because when a film is formed by using a resin having a coagulation value (determined by using water as a poor solvent) within the above-described specific range, and adding the predetermined amount of the poor solvent, a dense skin layer is less likely to be formed, and the affinity for a polishing slurry is increased.

In addition, the Shore A hardness of the polyurethane resin film of the present invention is preferably 40° or less, and further preferably 10 to 40°.

If the A hardness is below the above-described range, the elasticity becomes extremely high, so that the pad itself greatly deforms upon contact with a polishing workpiece, and the planarization performance deteriorates. On the other hand, if the A hardness is above the above-described range, defects tend to be formed because of the lack of the elasticity.

The contact area of the polyurethane resin film (polishing layer) of the present invention is preferably adjusted by an embossing treatment, a grooving treatment, or a punching treatment, so that the current value of a platen of a polishing machine can be in a range from 10 to 20 A during polishing under polishing conditions shown below.

It is particularly preferable to conduct an embossing treatment. In such a case, the flow beginning temperature of a resin matrix is preferably 220° C. or below, and further preferably 150 to 220° C. If the flow beginning temperature is too low, the polyurethane resin film is greatly degraded due to the heat generated during polishing, so that the flatness of the polished workpiece is impaired. On the other hand, if the flow beginning temperature is too high, the original resin is hard, so that defects are highly likely to be formed in the polishing workpiece.

In addition, the number of foamed cells of the polyurethane resin film of the present invention is preferably 100 cells/mm$^2$ to 270 cells/mm$^2$, and further preferably 130 cells/mm$^2$ to 240 cells/mm$^2$. Within the above-described range, both the polishing rate and the uniformity are good, and further the formation of defects can be suppressed. Note that, in this DESCRIPTION, the "number of foamed cells" means the number of cells per unit area on the top surface (after the grinding treatment) of the polishing layer made of the polyurethane resin film. The "number of foamed cells"

can be determined, for example, by enlarging the top surface with an electron microscope or the like, and using image processing software.

The pore area ratio of the polyurethane resin film in the polishing pad of the present invention is in a range from 5 to 30%, and more preferably 10 to 30%. In this DESCRIPTION, the pore area ratio means the ratio (%) of the pore area to the total area of the top surface of the polishing layer made of the polyurethane resin sheet (after the grinding treatment). Regarding the measurement of the pore area ratio (%), the pore area ratio (%) can be determined from, for example, the area of pore portions (cells) in a certain area obtained by observation with a scanning electron microscope.

The average pore diameter of the top surface of the polishing layer made of the polyurethane resin film of the present invention (after the grinding treatment) is preferably 30 µm or more, further preferably in a range from 30 to 50 µm, and more preferably in a range from 35 to 50 µm. When the average pore diameter is within the above-described range, polishing can be conducted with a high surface quality. In this DESCRIPTION, for the average pore diameter, an area (excluding grooved or embossed portions) of approximately 1.3 mm square of the top surface of the pad is observed by using a microscope (VH-6300 manufactured by KEYENCE) with 175 times magnification. The obtained image is subjected to binarization processing with image processing software (Image Analyzer V20 LAB Ver. 1.3 manufactured by Nikon Corporation). Then, the number of cells is determined. In addition, the equivalent circle diameters and the average value (average cell diameter) thereof are calculated from the areas of the cells. Note that the cutoff value (lower limit) of the cell diameters is set to 10 µm to remove noise components.

The polishing pad of the present invention is formed in a state where the foamed cells each having a rounded conical shape vertically long in the thickness direction (a vertically elongated triangular cross-section) are substantially uniformly dispersed over the entire polyurethane resin film. The lengths of the foamed cells in the vertical longitudinal direction vary within the range of the thickness of the polyurethane resin film. The foamed cells are formed such that the pore diameters on the polishing surface side can be smaller than the pore diameters on the bottom surface side.

The polyurethane resin of the present invention has a resin modulus of preferably 1 to 20 MPa, and more preferably 3 to 10 MPa. The resin modulus is an index indicating the hardness of a resin, and is a value obtained by dividing a load acting when a non-foamed resin film is stretched by 100% (stretched to a length which is two times of the original length) by a unit area (hereinafter, the resin modulus is also referred to as 100% modulus). A higher value of the resin modulus means a harder resin. When the resin modulus is within the above-described range, such an effect is obtained that a polishing workpiece can be polished efficiently with a high quality, because of the moderate elastic characteristics required for a polishing pad. If the resin modulus is too low, the top surface of the polishing pad excessively follows irregularities on the surface of a polishing workpiece, so that it is difficult to obtain polishing flatness. On the other hand, if the resin modulus is too high, defects tend to be formed. Hence, such cases are not preferable.

The polishing pad of the present invention may have a single-layer structure comprising only the polishing layer of the polyurethane resin film or a multi-layer structure in which another layer (underlying layer, support layer) is laminated on the opposite surface of the polishing layer from the polishing surface. Characteristics of the other layer are not particularly limited, and it is preferable to laminate a layer having a higher hardness (having a higher A hardness) than the polishing layer on the opposite surface of the polishing layer. The provision of a herder layer than the polishing layer makes it possible to avoid an influence of the minute irregularities of a polishing platen on the shape of the polishing surface, so that the polishing flatness is further improved. In addition, the rigidity of a polishing cloth becomes generally high, so that formation of winkles and the like can be suppressed during attachment of the polishing cloth to a platen.

In addition, in the present invention, when the polishing pad has a multi-layer structure, the multiple layers may be bonded and fixed to each other by using a double-sided tape, an adhesive agent, or the like, if necessary, under pressure. The double-sided tape or the adhesive agent used here is not particularly limited, and any one selected from double-sided tapes and adhesive agents known in this technical field can be used.

When the polishing pad of the present invention is used, the polishing pad is attached to a polishing platen of a polishing machine with the polishing surface of the polishing layer facing a polishing workpiece. Then, while slurry is being supplied, the polishing platen is rotated to polish the work surface of the polishing workpiece.

The polishing workpiece to be processed with the polishing pad of the present invention includes bare silicon, semiconductor devices, magnetic disks, and the like. In particular, the polishing pad of the present invention is preferable, because it is especially suitable for finish polishing of semiconductor devices.

Note that the polishing pad of the present invention may be subjected to surface grinding (buffing treatment) or removal of the surface by slicing.

Operations and Effects of the Present Invention

In the present invention, since the amount of the component(s) in the film formation composition insoluble in the solvent is small during the film formation, non-uniformity is less likely to be caused during the film formation, so that a uniform resin film can be formed.

In addition, the polishing pad of the present invention uses the resin having a coagulation value (determined by mainly using water as a poor solvent) within the specific range. As a result, such an unexpected effect can be obtained that the affinity for a polishing slurry is high during polishing, so that the slurry circulation becomes smooth. This is presumably because the addition of the poor solvent during the film formation of the resin having the specific coagulation value causes partial aggregation of the resin component in the resin solution, and this aggregation makes a dense skin layer less likely to be formed in the coagulation bath. In other words, the speed of the entering of the coagulation liquid into the resin solution and the speed of the extraction of the solvent by the coagulation liquid are increased, so that the solvent substitution proceeds stably. Presumably, as a result of this, no dense skin layer is formed.

EXAMPLES

Example 1

A resin-containing solution was obtained by adding 60 parts by mass of DMF and 5 parts by mass water to 100 parts by mass of a solution containing a polyester-based polyurethane resin (30 parts by mass) having a coagulation value (determined by using water as a poor solvent) of 10.8 as shown in Table 1 below and DMF (70 parts by mass), followed by mixing.

The obtained resin-containing solution was filtered to remove insoluble components. The solution was cast onto a polyester film. After that, the polyester film on which the resin-containing solution was cast was immersed in a coagulation bath (the coagulation liquid was water), and coagulation from the resin-containing solution was conducted, followed by washing and drying. Thus, a resin film was obtained. A top surface of the obtained resin film was subjected to a grinding treatment, and then the resin film and a double-sided tape was laminated on each other. Thus, a polishing pad was obtained. Note that "parts" in Table 1 means "parts by mass" unless otherwise noted.

Resin 1: a polyester-based polyurethane resin having a 100% modulus of 7.8 MPa and a coagulation value of 10.8

Resin 2: a polyester-based polyurethane resin having a 100% modulus of 6.0 MPa and a coagulation value of 13.3

Examples 2 to 5 and Comparative Examples 1 to 3

In each of Examples 2 to 5, a polishing pad was produced under the same conditions as those in Example 1 except for the type of the resin and the amount of the poor solvent (those shown in Table 1).

In Comparative Example 1, a polishing pad was produced in the same manner as in Example 2, except that carbon black was added, and no poor solvent was used. In Comparative Example 2, a polishing pad was produced in the same manner as in Example 2, except that no poor solvent was added. In Comparative Example 3, a polishing pad was produced in the same manner as in Example 2, except that the amount of the poor solvent added was increased.

<Evaluation of Physical Properties>

Measurement Values and Measurement Method of "Undissolved Content"

Each of the polyurethane resin films was dissolved in DMF, which is a solvent capable of dissolving the polyurethane resin, at a solid content concentration of 1% by mass. The solution was centrifuged and then filtered (pore diameter of filtration filter: 1 µm, material: cellulose), and then the filter paper was dried in the air. The undissolved content was determined from the weight of the filter paper.

Method for Determining "Number of Foamed Cells"

For the average cell diameter (µm) and the number of cells per $mm^2$, an area (excluding grooved or embossed portions) of approximately 1.3 mm square of the top surface of each pad was observed by using a microscope (VH-6300 manufactured by KEYENCE) with 175 times magnification. The obtained image was subjected to binarization processing with image processing software (Image Analyzer V20 LAB Ver. 1.3 manufactured by Nikon Corporation). Then, the number of cells was determined. In addition, the equivalent circle diameters and the average value (average cell diameter) thereof were calculated from the areas of the cells. Note that the cutoff value (lower limit) of the cell diameters was set to 10 µm to remove noise components.

In the measurement of the "Shore A hardness," sample pieces (10 cm×10 cm) were cut out of each of the foamed sheets, and multiple sample pieces were stacked together to a thickness of 4.5 mm or more. Then, the Shore A hardness was measured with a durometer type A (Japanese Industrial Standard JIS K 7311). For example, when the thickness per sample piece was 1.4 mm, four pieces were stacked and then measured.

For the measurement of the average pore diameter (µm) and the pore area ratio (%), 9 points each having an area of approximately 5 mm square were observed by using a scanning electron microscope (JSM-5500 LV manufactured by JEOL Ltd.) with 1000 times magnification. This image was subjected to binarization processing using image processing software (Image Analyzer V20 LAB Ver. 1.3 manufactured by Nikon Corporation) to determine the number of pores (number of cells), and the equivalent circle diameters and the average value thereof as the average pore diameter were calculated from the areas of the pores (cells). In addition, the ratio of areas of the pores (cells) in the areas of 5 mm square was calculated as the pore area ratio (%). Note that the cutoff value (lower limit) of the cell diameters was set to 11 µm to remove noise components.

<Polishing Test>

A polishing treatment was conducted by using each of the polishing pads of Examples and Comparative Examples under the polishing conditions shown below, and the polishing rate, the polishing uniformity, and the presence or absence of defects were determined. The polishing workpieces used were substrates (uniformity (CV %) of 13%) in each of which an insulating film was formed from tetraethoxysilane by CVD to a thickness of 1 µm on a 12-inch silicon wafer. Twenty five substrates were polished successively, and the stability of the rate was evaluated from the polishing rates and the polishing uniformity of the first, tenth, and twenty-fifth substrates.

Polishing machine: EBARA F-REX300

Polishing head: GII

Slurry: Slurry of Planar Solutions, LLC

Workpieces: SIO2 (TEOS) of 300 mm in diameter

Pad diameter: 740 mm

Pad break: 9 N×30 minutes, diamond dresser: 54 rpm, number of revolutions of platen: 80 rpm, ultra pure water: 200 ml/min Polishing: number of revolutions of platen: 70 rpm, number of revolutions of head: 71 rpm, flow rate of slurry: 200 ml/min, polishing time: 60 seconds (Polishing Rate)

The polishing rate was the amount polished per minute expressed by the thickness (Å). Before and after the polishing treatment, the thicknesses at 121 points of the insulating film on each of the substrates were measured, and the average value was determined from the measurement results. Note that these thicknesses were measured by the DBS mode using an optical film-thickness and film-quality measuring apparatus (ASET-F5x manufactured by KLA-Tencor Corporation).

(Polishing Uniformity)

The polishing uniformity was the dispersion (standard deviation/average value) (%) of the polished amounts (thicknesses) determined from the thickness measurement results before and after the polishing treatment at the 121 points measured for determining the polishing rate.

(Presence or Absence of Defects)

For defect evaluation, 25 substrates were sequentially polished repeatedly three times. After the polishing treatment, five substrates, namely, 21st to 25th substrates, were measured with an unpatterned wafer surface inspection system (Surfscan SP1DLS manufactured by KLA-Tencor Corporation) in the high-sensitivity measurement mode. Thus, the presence or absence of defects on the top surface of each substrate was evaluated.

<Results>

Parts (a) and (b) of FIG. 1 show photographs of cross-sections of the polishing pads obtained in Examples 1 to 5 and Comparative Examples 1 to 3, and Table 1 shows the results of each evaluation.

As shown in Table 1, in Example 1, carbon black was not added, and the foaming was controlled by the poor solvent.

In Comparative Example 2, neither the carbon black, nor the poor solvent was added. For this reason, the result was that the shapes of the foamed cells were unstable, and the uniformity (Uni) decreased.

In Comparative Example 3, the polishing pad was produced in the same manner as in Example 1, except that the amount of the poor solvent added was increased. Since the poor solvent was added in an amount exceeding the set range, the resin component in the resin solution aggregated, and stable film formation was not achieved. In addition, the results showed that the number of foamed cells was small, and the rate was low.

TABLE 1

|  | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Resin | Resin 2 | Resin 1 | Resin 1 | Resin 2 | Resin 2 | Resin 1 | Resin 1 | Resin 2 |
| Resin 100% modulus (MPa) | 6.0 | 7.8 | 7.8 | 6.0 | 6.0 | 7.8 | 7.8 | 6.0 |
| Flow beginning temperature (° C.) | 195 | 215 | 215 | 195 | 195 | 215 | 215 | 195 |
| Coagulation value | 10.8 | 13.3 | 13.3 | 10.8 | 10.8 | 13.3 | 13.3 | 10.8 |
| Carbon black (% by mass) [*1] | 0.0 | 0.0 | 0.0 | 0.0 | 0.0 | 7.0 | 0.0 | 0.0 |
| Coagulation value × A (0.007 to 0.027) (ml/g of solid content mass of polymer resin) | 0.08–0.29 | 0.09–0.36 | 0.09–0.36 | 0.08–0.29 | 0.08–0.29 | 0.09–0.36 | 0.09–0.36 | 0.08–0.29 |
| Water (ml/g of solid content mass of polymer resin) | 0.17 | 0.10 | 0.35 | 0.08 | 0.29 | 0.0 | 0.0 | 0.33 |
| After film formation |  |  |  |  |  |  |  |  |
| Thickness (mm) | 0.9 | 1.1 | 1.2 | 1.0 | 1.1 | 1.0 | 1.0 | 1.1 |
| Density (g/cm$^3$) | 0.29 | 0.25 | 0.25 | 0.29 | 0.29 | 0.26 | 0.26 | 0.29 |
| Compression ratio (%) | 19 | 15 | 18 | 20 | 23 | 8 | 12 | 26 |
| Compressive elastic modulus (%) | 96 | 96 | 98 | 98 | 98 | 91 | 95 | 98 |
| Type A hardness (°) | 21.8 | 18.0 | 14.8 | 21.2 | 19.7 | 21.5 | 19.1 | 19.4 |
| After grinding treatment |  |  |  |  |  |  |  |  |
| Thickness (mm) | 0.80 | 0.81 | 0.81 | 0.80 | 0.80 | 0.79 | 0.81 | 0.80 |
| Density (g/cm$^3$) | 0.28 | 0.23 | 0.22 | 0.28 | 0.28 | 0.24 | 0.26 | 0.28 |
| Compression ratio (%) | 21 | 17 | 25 | 25 | 31 | 14 | 17 | 31 |
| Compressive elastic modulus (%) | 97 | 98 | 97 | 95 | 96 | 93 | 96 | 98 |
| Type A hardness (°) | 18.7 | 14.34 | 10.78 | 18.27 | 16.60 | 20.3 | 16.8 | 16.38 |
| Average pore diameter (μm), SEM, 50 times | 45.5 | 40.2 | 43.2 | 36.0 | 40.2 | 30.7 | 33.4 | 38.9 |
| Pore ratio (%), SEM, 50 times | 25.4 | 25.4 | 22.1 | 23.2 | 18.2 | 22.1 | 26.0 | 18.7 |
| Number of foamed cells (/mm$^2$) | 157 | 200 | 107 | 228 | 143 | 300 | 297 | 96 |
| Current value (A) | 14.7 | 14.8 | 12.8 | 15.5 | 13.7 | 22.1 | 15.3 | 12.8 |
| Polishing rate (Å) | 612 | 765 | 569 | 687 | 598 | 783 | 793 | 478 |
| Uniformity (%) | 3.6 | 3.2 | 3.1 | 3.2 | 3.1 | 3.5 | 4.3 | 3.2 |
| Number of defects (Wide) | 63 | 73 | 97 | 58 | 74 | 152 | 86 | 85 |
| Number of defects (Narrow) | 26 | 39 | 65 | 28 | 38 | 131 | 48 | 48 |
| Undissolved content (% by mass) [*2] | 0 | 0 | 0 | 0 | 0 | 7.1 | 0 | 0 |

[*1] The amount of carbon black is expressed in % by mass relative to the solid content of the polyurethane resin solution.
[*2] The undissolved content is expressed in % by mass relative to the dry mass of the polyurethane resin film.

Hence, no undissolved content was contained, and defects of the polishing workpieces greatly decreased. On the other hand, the pad of Comparative Example 1 caused a large number of defects of the polishing workpieces. This was because an undissolved content was contained at 7.1% by mass due to the addition of the carbon black.

In Examples 4 and 5, the polishing pads were produced in the same manner as in Example 1, except that the amount of the poor solvent added was changed. In each of Examples 4 and 5, stable film formation was achieved, and the obtained polishing pad was acceptable in terms of the defects, the rate (RR), and the uniformity (Uni) of the polishing workpieces.

In Examples 2 and 3, the polishing pads were produced in the same manner as in Example 1, except that the resin and the amount of the poor solvent added were changed. In each of Examples 2 and 3, stable film formation was achieved, and the obtained polishing pad was acceptable in terms of the defects, the rate (RR), and the uniformity (Uni) of the polishing workpieces.

The invention claimed is:

1. A method for producing a polishing pad comprising a film formation substrate, and a polyurethane resin film as a polishing layer on the film formation substrate, the method comprising the steps of:
dissolving a composition for forming polyurethane resin film containing a polyurethane resin and an additive in a solvent capable of dissolving the resin;
removing an insoluble component to make the content of the insoluble component in the solution less than 1% by mass relative to the total mass of solid content in the composition for forming polyurethane resin film;
adding a poor solvent to the solution from which the insoluble component has been removed, followed by mixing, the amount of the poor solvent in terms of ml to be added per gram of the solid content mass of the resin being calculated according to Formula 1: the amount (ml)=a coagulation value (ml) of the polyurethane resin determined by using the poor solvent×A, wherein A is within 0.007 to 0.027; and forming a film from the mixture solution on the film formation substrate by a wet coagulation method, to thereby form the polyurethane resin film, wherein the poor solvent is water, wherein the polyurethane resin has a resin modulus of 1 to 20 MPa, and wherein the method is free of a foam-controlling auxiliary agent and a film formation-stabilizing auxiliary agent.

2. The production method according to claim 1, wherein the solvent capable of dissolving the polyurethane resin is a water-miscible organic solvent.

3. A polishing pad comprising:

a film formation substrate; and a polyurethane resin film formed on the film formation substrate by a wet coagulation method as a polishing layer, wherein the content of a component which is insoluble when the polyurethane resin film is dissolved in a solvent capable of dissolving a polyurethane resin forming the film is less than 1% by mass relative to a dry mass of the polyurethane resin film, the polyurethane resin has a coagulation value, which has been determined by using water as a poor solvent, in a range from 8 ml to 20 ml, and the number of foamed cells on a top surface of the polishing layer made of the polyurethane resin film is 100 cells/mm² to 270 cells/mm², wherein the polyurethane resin has a resin modulus of 1 to 20 MPa, and wherein the polishing pad is free of a foam-controlling auxiliary agent and a film formation-stabilizing auxiliary agent.

4. The production method according to claim 1, wherein the polyurethane resin has a coagulation value, which has been determined by using the poor solvent, in a range from 8 ml to 20 ml.

5. The polishing pad according to claim 3, wherein an average pore diameter on a top surface of the polishing layer made of the polyurethane resin film is 30 μm or more.

6. The production method according to claim 2, wherein the polyurethane resin has a coagulation value, which has been determined by using water as a poor solvent, in a range from 8 ml to 20 ml.

7. The method according to claim 4, wherein an average pore diameter on a top surface of the polishing layer made of the polyurethane resin film is 30 μm or more.

8. The method according to claim 6, wherein an average pore diameter on a top surface of the polishing layer made of the polyurethane resin film is 30 μm or more.

9. The method according to claim 1, wherein the polishing pad consists of the film formation substrate, and the polyurethane resin film as the polishing layer on the film formation substrate.

10. The method according to claim 9, wherein the film formation substrate is a polyester film.

11. The method according to claim 1, wherein the polyurethane resin has a coagulation value, which has been determined by using the poor solvent, in a range from 8 ml to 20 ml, the method further comprises subjecting the polyurethane resin film to an embossing treatment, and the polyurethane resin film has a flow beginning temperature of 220° C. or below.

12. The method according to claim 11, comprising subjecting the polyurethane resin film to an embossing treatment, wherein the polyurethane resin has a flow beginning temperature of 150° C. to 220° C.

13. The method according to claim 1, wherein the polyurethane resin has a resin modulus of 3 to 10 mpa.

14. The polishing pad according to claim 3, wherein the polyurethane resin film has been subjected to an embossing treatment, and the polyurethane resin has a flow beginning temperature of 220° C. or below.

15. The polishing pad according to claim 3, wherein the polyurethane resin film has been subjected to an embossing treatment, and the polyurethane resin has a flow beginning temperature of 150° C. to 220° C.

16. The polishing pad according to claim 3, wherein a Shore A hardness of the polyurethane resin film is 10° to 400.

17. The polishing pad according to claim 3, wherein the polyurethane resin film has a pore area ratio of from 5% to 30%.

18. The polishing pad according to claim 3, wherein an average pore diameter on a top surface of the polishing layer made of the polyurethane resin film is in a range from 35 μm to 50 μm.

* * * * *